Aug. 21, 1951     B. B. LENHART ET AL     2,564,983
NONJAMMING FEED MECHANISM FOR NUT SHELLING MACHINES
Filed May 5, 1947     2 Sheets-Sheet 1

INVENTORS
BERNARD B. LENHART
MARSHALL W. McGRATH
BY
ATTORNEYS

Aug. 21, 1951     B. B. LENHART ET AL     2,564,983
NONJAMMING FEED MECHANISM FOR NUT SHELLING MACHINES
Filed May 5, 1947     2 Sheets-Sheet 2

INVENTORS
BERNARD B. LENHART
MARSHALL W. MC GRATH
BY

ATTORNEYS

UNITED STATES PATENT OFFICE 2,564,983

NONJAMMING FEED MECHANISM FOR NUT SHELLING MACHINES

Bernard B. Lenhart, Mill Valley, and Marshall W. McGrath, San Francisco, Calif.

Application May 5, 1947, Serial No. 746,002

5 Claims. (Cl. 146—8)

This invention relates to a feeding device, and more particularly to a device of this nature adapted for use with a nut shelling apparatus of the type described in our copending applications, Serial No. 703,029, filed October 12, 1946, now abandoned, and Serial No. 724,494, filed January 27, 1947, now Patent No. 2,512,107, granted June 20, 1950.

In our copending application Serial No. 703,029, there is set forth a nut shelling apparatus comprised of an open-ended cylindrical tube having a plurality of radially arranged passages through the wall thereof, said passages being angularly inclined toward the mouth of the tube and being enclosed on the outside of the tube by an air pressure manifold communicating with any controllable source of pressurized air. When high velocity or pressurized air is passed through the radially arranged passages into the tube toward the mouth thereof, a pressure differential is set up within the tube between the opposite ends thereof and the air passages. Thus, as nuts are fed into the tube at the high pressure end, they are impelled through the tube at a high velocity to issue from the tube mouth. A suitable target in spaced alignment with the tube mouth was provided so that the issuing nuts would strike the target, thereby fracturing the nut shell. In our later filed copending application Serial No. 724,494 a novel shell fracturing device is provided as an extension attachment for the tube mouth, said device being comprised of a collar adapted to be removably secured to the tube mouth, and a plurality of radially arranged spring urged members adjustably projecting through the wall of the collar and into the outer periphery of the nut path as defined by the inside diameter of the tube. The nuts in passing between the converging yieldable members force these members out of the path of travel of the nuts, so that the nuts may issue from the mouth of the attachment collar, but in the process of forcing the yieldable members aside, the nut shells are fractured in a highly efficient manner.

We have found that it is preferable, though not essential, to provide a plurality of apertures in the nut tube between the air inlet apertures and the feeding end of the tube, thereby eliminating any suction pressure at the immediate tube end. By this expedient we inhibit any tendency of the nut to block the feed end of the tube by being held cross-wise of the tube end by the suction pressure. We have found that in the feeding of the nuts into the tube, it will occasionally occur that a nut is not properly fed lengthwise into the tube, thereby causing a tube impeding suspension of the improperly fed nut. As a direct result of our provision of pressure reducing apertures forward of the feed end of the tube, we now prefer to suspend the tube in a vertical position in order to utilize a gravity feed to supplant the previous suction pressure feed.

As will hereinafter more clearly appear, we have now provided a feeding device to be attached to the tube adjacent the feeding end thereof for the purpose of positively preventing the jamming of the feed end of the tube due to any cross-wise orientation of the gravity fed nuts as they come in contact with the feed end.

Broadly, the feeding device of the invention is a combination comprising a toothed feed end for the tube, an arcuate plate or cam member slightly spaced thereabove, and motive power means and a drive connection between said means and said cam member to cause a constant rotation of the latter. The cam member preferably comprises an arcuate segment having substantially the same radius of curvature as the wall of the nut tube, said member being arranged so that its leading edge is in alignment with that portion of the tube therebeneath, and so that there is a gradual but slight subtending of the space defined by the inside surface of the tube therebeneath. The cam members so rotate in relation to the sharp edges of the teeth of the stationary tube so that any nut lodged in canted or cross-wise fashion at the feed end of the tube will be held stationary at its lower or tooth contacting end while it is pivoted upwardly to assume a lengthwise orientation with respect to the axis of the tube, whereupon the nut gravitates into the tube proper for passage therethrough. As an added element of the feeding device combination, the rotatable cam member is provided with an agitator or stirring arm adapted to project upwardly into a funnel type hopper located just above the cam member, said agitator member being effective to prevent jamming of the nuts as they pass through the neck portion of the funnel and to further provide a positive and progressive gravitation of the nuts toward the neck portion of the funnel. Having thus briefly set forth the essential features of the preferred embodiment of the invention, it is apparent that the primary object of the invention is to provide a positive acting and efficient device adapted to prevent the jamming of nuts at the feed end of a nut shelling apparatus of the tube or gun type. Further objects of the invention are to provide a feeding device of the gravity type for a nut shelling apparatus whereby a continuous supply of nuts is provided at the feed end of the apparatus, and to provide a nut shelling apparatus of the tube or gun type, as set forth in our copending applications hereinabove mentioned, whereby suction pressure is inhibited at the immediate feed end of the tube.

These and other objects of the invention will be apparent from the following description taken in conjunction with the drawings forming part of this specification, and in which.

Figure 1:
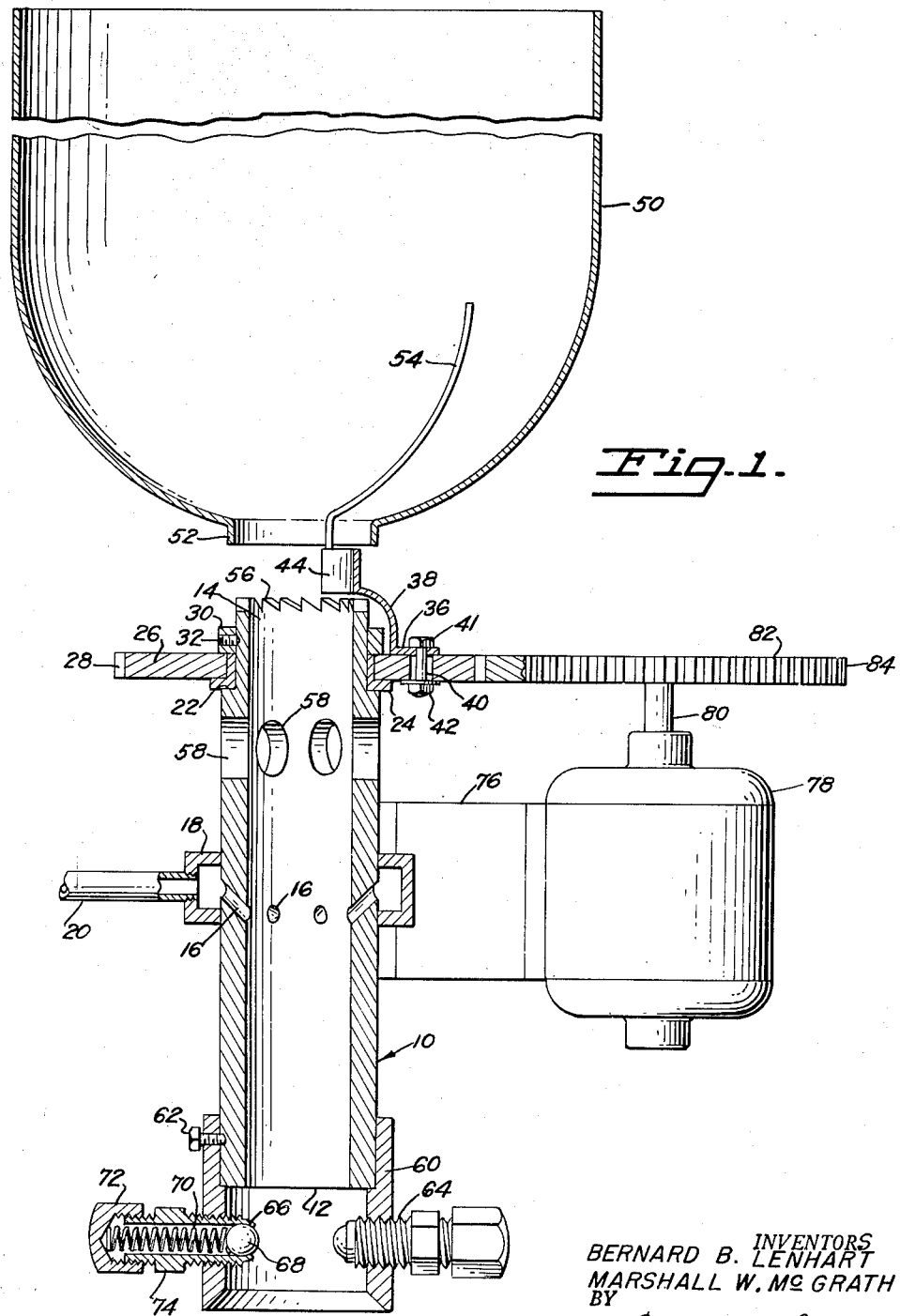
Figure 1 is a view in sectional elevation showing the complete arrangement of the nut shelling apparatus, including the tube clearance and feeding device.
Figure 2:
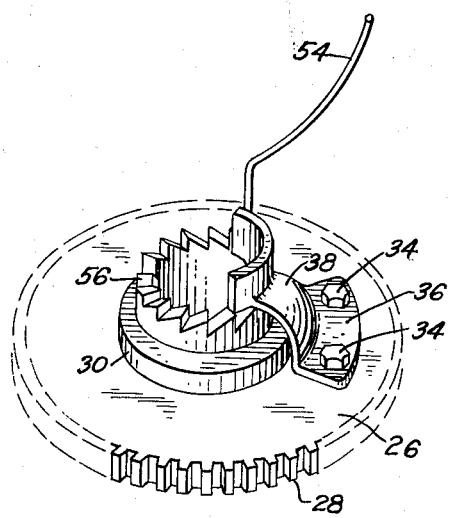
Figure 2 is a view in perspective of the tube clearance and feeding device of the invention.

Referring to the drawings for more specific details of the invention, 10 indicates generally a cylindrical tube having an open discharge end or mouth 12 and an open feed end 14. The tube is provided with a plurality of radially arranged apertures 16 angularly inclined toward the mouth 12 of the tube, the outer ends of said apertures being enclosed by an annular manifold 18 having a conduit 20 providing for communication between said manifold and a source of pressurized air, not shown. The tube 10 is provided with a shoulder 22 which serves as a support for a flanged bearing ring 24, said bearing ring 24 serving as the support for a gear wheel 26 having a plurality of peripheral teeth 28. Another bearing ring 30 sleeved on the tube 10 and adapted to be secured thereto by set screws 32 serves to secure the gear wheel 26 in place on the tube.

A pair of bolts 34 are provided to secure the foot plate 36 of a bracket 38 to the gear wheel 26, said bolts being passed through suitable holes in the foot plate 36 and through larger holes 40 in the gear wheel. Nuts 42 are adapted to secure the bolts in place on the gear wheel 26. Supported at the upper end of the bracket 38 is an oblong arcuate plate or cam member 44 having substantially the same radius of curvature as the wall of the tube 10. The foot plate 36 of the bracket 38 is secured to the gear wheel 26 in such manner that the leading edge 46 of the cam member 44 is in alignment with the inner wall of tube 10, while the trailing edge 48 of the cam member subtends the space defined by the inner wall of the tube. The degree to which the trailing edge of the cam member extends over or subtends the space defined by the inner wall of the tube may be varied by a loosening of one or both nuts 42 and an adjustable pivoting of the foot plate 36 of the bracket 38. Drilled holes 40 in the gear wheel 26 are of sufficient diameter over and above the sides of the spindle portion of the bolts 41 so as to allow for pivotal adjustment of the cam member 44.

A suitable feed hopper 50 having a discharge funnel 52 of substantialy the same size as the diameter of the tube 10 and in alignment with said tube directly above the cam member 44 is supported by appropriate means, not shown, while an agitator arm 54 secured to the cam member 44 projects a substantial distance into the hopper 50.

The tube 10 is further characterized by the provision of a plurality of teeth 56 at the feed end 14, said teeth being uniformly inclined in a direction opposite to the hereinafter described direction of rotation of the cam member 44, while a plurality of apertures 58 are provided in the tube between the feed end 14 thereof and the angularly inclined apertures 16. A nut shelling attachment comprising a collar 60 secured to the discharge mouth of the tube 10 by set screws 62, said collar having a plurality of radially adjustable nipples 64 having shoulders 66 adapted to retain steel balls 68 therein against the force of compression spring 70 held in place by threaded caps 72 adapted to be adjusted at the outer end of the nipples to vary the force exerted by the spring 70 against the balls 68. Each nipple is provided with a hexagonal portion 70 adapted to be engaged by a wrench to vary the degree to which the nipples project within the collar 60. This nut shelling attachment is described and claimed in our copending application Serial No. 724,494.

The tube 10 and attached parts heretofore described are supported by a bracket 76 secured to an electric motor 78, said motor being in turn supported by any suitable standard, not shown. The motor 78 has a driven shaft 80 to which there is secured for rotation a gear wheel 82 having a plurality of teeth 84 adapted to mesh with the teeth 28 of gear wheel 26.

Figure 3:
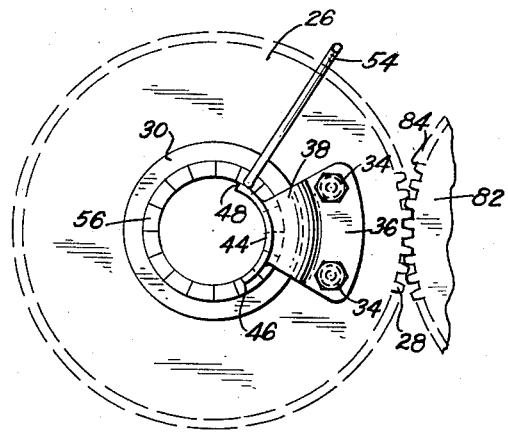
Figure 3 is a plan view of the device of Figure 2.
Figure 4:
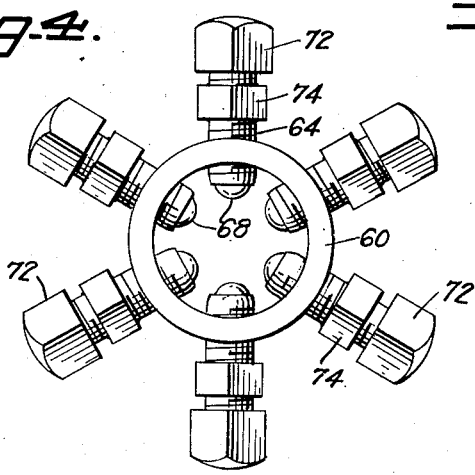
Figure 4 is a plan view of the discharge end of the nut shelling apparatus.

Having thus described the structure of the preferred embodiment of the invention, the operation of the apparatus will be hereinafter described in detail. Pressurized air is admitted through the conduit 20 to the manifold 18 and through the angularly inclined apertures 16 to issue from the end of collar 60, thus causing air to pass into the tube through the apertures 58 toward the low pressure area caused by the high velocity check issuing from apertures 16. Due to the provision of apertures 58, there is no substantial suction pressure at the feed end 14 of the tube. The electric motor 78 is then actuated to rotate shaft 80 and gear wheel 82 and drive gear wheel 26 and cam member 44 carried thereby in a clockwise direction, as viewed in Figure 3. When the hopper 50 is then loaded with nuts to be shelled, the nuts gravitate therefrom through the neck portion 52 at a substantially constant rate under the influence of the rotating agitator arm 54. As the nuts drop into the feed end 14 of the tube, they are accelerated in their passage therethrough by gravitational force until they reach the apertures 58, whereupon they are rapidly accelerated under the influence of the pressure differential existing between the apertures 58 and the apertures 16. As the nuts issue from the mouth 12 of the tube at a high rate of velocity, they are forced between the converging balls 68 to move said balls inwardly of the nipples 64 against the force of the spring 70, thereby causing a fracturing of the nut shells as the nuts pass between the balls 68 to issue from the end of collar 60.

The inside diameter of tube 10 is just large enough to accommodate the largest of a particular species of nuts to be shelled, since the efficient imparting of a high rate of velocity to the nuts as they travel through the tube requires that there be no substantial oversize of the tube diameter with respect to the size of the nuts. Since the differential in size between the inside diameter of the tube and the girth of the nuts is small, it frequently occurs that a nut will become jammed in the feed end of the tube due to the fact that the nut comes in contact with the tooth end of the tube with its longitudinal axis crosswise with respect to the tube. In this position the nut will be supported by the teeth 56 so that at least a portion thereof will be in the path of the cam member 44. When this occurs, the constantly rotating cam member sweeps that portion of the nut which overlaps the inside diameter of the tube out of its overlapping position so that the nut is free to fall downwardly into the tube. A lodged nut is acted upon by the cam member so that the portion of the nut which overlaps the tube wall and which is first contacted by the cam member is pivoted upwardly while the other end of the nut is held stationary by the gripping action of the teeth 56 which are angularly inclined in a direction opposite to the direction of rotation of the cam member. Thus, a combined rotative movement together with an upward pivoting is imparted to the nut to get the longitudinal axis thereof into a position approaching alignment with the axis of the tube, whereupon the nut is free from any overlapping contact with the teeth 56 and may fall into the tube. Occasionally, a nut may become so lodged in the feed end of the tube while projecting upwardly therefrom that it cannot be rotated and pivoted upwardly by the action of the cam member to fall within the tube. In this case, the cam member merely cracks the shell of the nut, and the nut is thereby freed from its jamming engagement with the teeth 56 and the feed end of the tube. In any case, the constant rotation of the cam member 44 is effective to maintain the feed end of the tube clear of any lodged nuts so that the apparatus can process a substantially constant stream of nuts fed thereto. We have found that as many as five to ten nuts may pass freely into the feed end of the tube with their longitudinal axes substantially parallel to the axis of the tube before a canted nut may come along to lodge in the feed end. Consequently, we find that when the cam member 44 is rotated at a speed of approximately 80 R. P. M., the operator can efficiently shell approximately one hundred twenty-five nuts in this period of time with no necessity of ever ceasing operation of the apparatus to remove a jammed nut from the feed end of the tube. The agitator arm 54 in conjunction with the restricted opening 52 of the hopper 50 causes the majority of the nuts to issue from the hopper with their longitudinal axes in more or less alignment with the axis of the tube.

It is to be pointed out that the space between the upper edge of the teeth 56 and the lower edge of the neck 52 of the hopper is not sufficient to allow the lateral escape of any nuts in passing between the hopper and the tube.

While the preferred embodiment of the invention has been shown and described, it is to be understood that this embodiment is subject to modification within the spirit of the invention and the scope of the appended claims.

What we claim as new and desire to secure by Letters Patent is:

1. In a nut shelling apparatus, the combination of a fixedly positioned tube, means associated with said tube to impart accelerated movement to nuts entering therein at the feed end, means associated with the discharge end of the tube to fracture the nut shells by a striking of the nuts thereagainst, movable means carried by the tube and acting in conjunction with the edge of the feed end to prevent the obstructive lodging of nuts in said feed end, driving means for said movable means, said movable means comprising a member adapted to sweep an annular path adjacent the feed end of the tube in spaced relation thereto, the inner face of said member being in substantial alignment with the inner wall of the tube at the forepart of the member, as denoted by its direction of travel, with said inner face progressively subtending the peripheral margin of the tube bore as the trailing edge of said member is approached, means carried by said member for varying the degree to which the annular path of same subtends the bore of the tube, and teeth on the feed end of the tube having biting edges inclined oppositely to the direction of rotation of said member.

2. For a fixedly positioned tube having a feed end into which articles are to be passed, and a discharge end from which said articles issue, in combination therewith an anti-obstruction device for the feed end comprising an oblong arcuate cam member carried for rotational movement by the tube in non-contacting juxtaposition with the feed end of the tube, said member being adapted to sweep in the direction of its length an annular path about the axis of the tube and having a portion of its face in alignment with the wall of the tube.

3. For a fixedly positioned tube having a feed end into which a succession of articles are to be passed, and a discharge end from which said articles issue, in combination therewith an anti-obstruction device comprising an oblong arcuate cam member carried for rotational movement by the tube in non-contacting juxtaposition with the feed end of the tube and for movement in the direction of its length in an annular path about the axis of the tube, said cam member having a portion which slightly subtends the outer margin of the space defined by the inner wall of the tube.

4. The combination as set forth in claim 3, wherein the feed end of the tube is provided with a circumferentially serrated edge constituting a gripping means for any portion of an article thereagainst as a substantially oppositely disposed portion of said article is contacted by the cam member.

5. The combination as set forth in claim 4, wherein said serrated edge is comprised of a plurality of teeth having the biting edges thereof angularly inclined oppositely to the direction of travel of said cam member.

BERNARD B. LENHART.
MARSHALL W. McGRATH.

REFERENCES CITED

The following references are of record in the file of this patent:

UNITED STATES PATENTS

| Number | Name | Date |
|---|---|---|
| 353,143 | Koerber | Nov. 23, 1886 |
| 842,601 | Woodson et al. | Jan. 29, 1907 |
| 1,185,895 | Fast | June 6, 1916 |
| 1,313,990 | Jackson | Aug. 26, 1919 |
| 2,028,219 | Johnson | Jan. 21, 1936 |
| 2,108,163 | Clark | Feb. 15, 1938 |
| 2,366,448 | Greene et al. | Jan. 2, 1945 |
| 2,381,288 | Jones | Aug. 7, 1945 |